(12) United States Patent
Fukui

(10) Patent No.: US 7,233,694 B2
(45) Date of Patent: Jun. 19, 2007

(54) IMAGE CAPTURING APPARATUS AND METHOD, COMPUTER PROGRAM, AND COMPUTER-READABLE RECORDING MEDIUM THEREFOR

(75) Inventor: Takaaki Fukui, Kanagawa (JP)

(73) Assignee: Canon Kabushiki Kaisha, Tokyo (JP)

(*) Notice: Subject to any disclaimer, the term of this patent is extended or adjusted under 35 U.S.C. 154(b) by 877 days.

(21) Appl. No.: 10/452,225

(22) Filed: Jun. 3, 2003

(65) Prior Publication Data
US 2003/0234880 A1    Dec. 25, 2003

(30) Foreign Application Priority Data
Jun. 21, 2002    (JP) .............................. 2002-181976

(51) Int. Cl.
*G06K 9/00*    (2006.01)

(52) U.S. Cl. ...................................... 382/162; 382/167

(58) Field of Classification Search ................ 382/162, 382/165, 167; 345/589, 590
See application file for complete search history.

(56) References Cited

U.S. PATENT DOCUMENTS 7,024,055 B2 *    4/2006    Newman .................... 382/162
7,079,284 B2 *    7/2006    Kawakami et al. ......... 382/162

* cited by examiner

*Primary Examiner*—Phuoc Tran
(74) *Attorney, Agent, or Firm*—Fitzpatrick, Cella, Harper & Scinto

(57) ABSTRACT

An image capturing apparatus detects an out-of-gamut region falling outside a predetermined color gamut in accordance with an image capturing condition or image generating parameter of a captured image. A monitor displays the detected out-of-gamut region along with the captured image from an imager to enable a user to easily select the color space most appropriate for the captured image at the time the image is captured. At the time the image is captured, the user selects the image capturing condition or image generating parameter most appropriate for the captured image in accordance with the color reproduction range of an output deice. From a recorded captured image, the user estimates the output result of the output device by displaying an out-of-gamut region in accordance with the image capturing condition or image generating parameter at the time the image is captured.

24 Claims, 13 Drawing Sheets

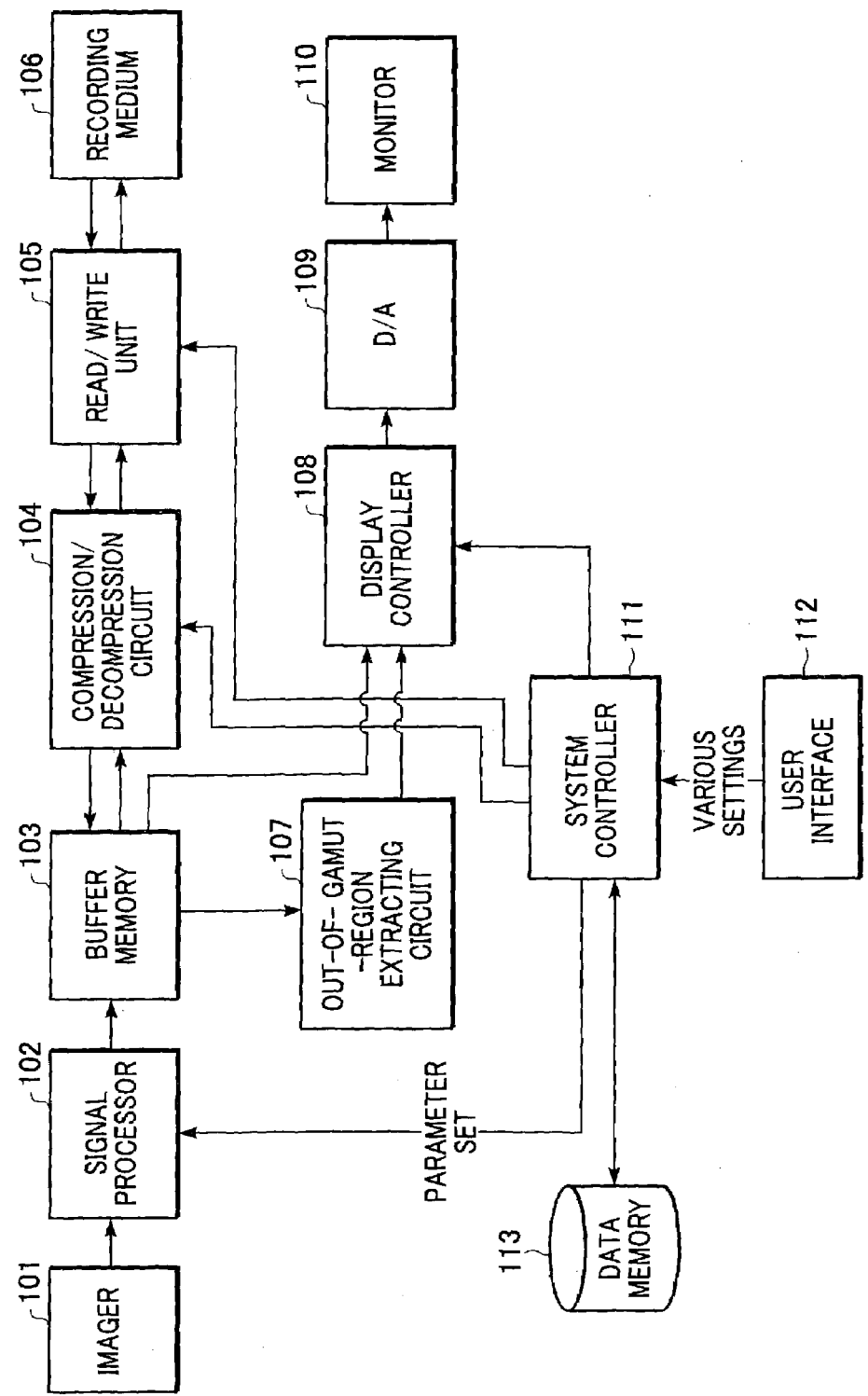

FIG. 10

| LUMINANCE | BLUE REPRODUCTION RANGE | | GREEN REPRODUCTION RANGE | | RED REPRODUCTION RANGE | |
|---|---|---|---|---|---|---|
| Y | x | y | x | y | x | y |
| 0 | 0.31 | 0.33 | 0.31 | 0.33 | 0.31 | 0.33 |
| 10 | 0.37 | 0.33 | 0.3 | 0.38 | 0.26 | 0.28 |
| 20 | 0.4 | 0.33 | 0.28 | 0.44 | 0.22 | 0.24 |
| 30 | 0.45 | 0.33 | 0.27 | 0.53 | 0.16 | 0.2 |
| 40 | 0.55 | 0.33 | 0.26 | 0.6 | 0.12 | 0.17 |
| 50 | 0.67 | 0.33 | 0.25 | 0.65 | 0.1 | 0.15 |
| 60 | 0.55 | 0.33 | 0.26 | 0.6 | 0.12 | 0.17 |
| 70 | 0.45 | 0.33 | 0.27 | 0.53 | 0.16 | 0.2 |
| 80 | 0.4 | 0.33 | 0.28 | 0.44 | 0.22 | 0.24 |
| 90 | 0.37 | 0.33 | 0.3 | 0.38 | 0.26 | 0.28 |
| 100 | 0.31 | 0.33 | 0.31 | 0.33 | 0.31 | 0.33 |

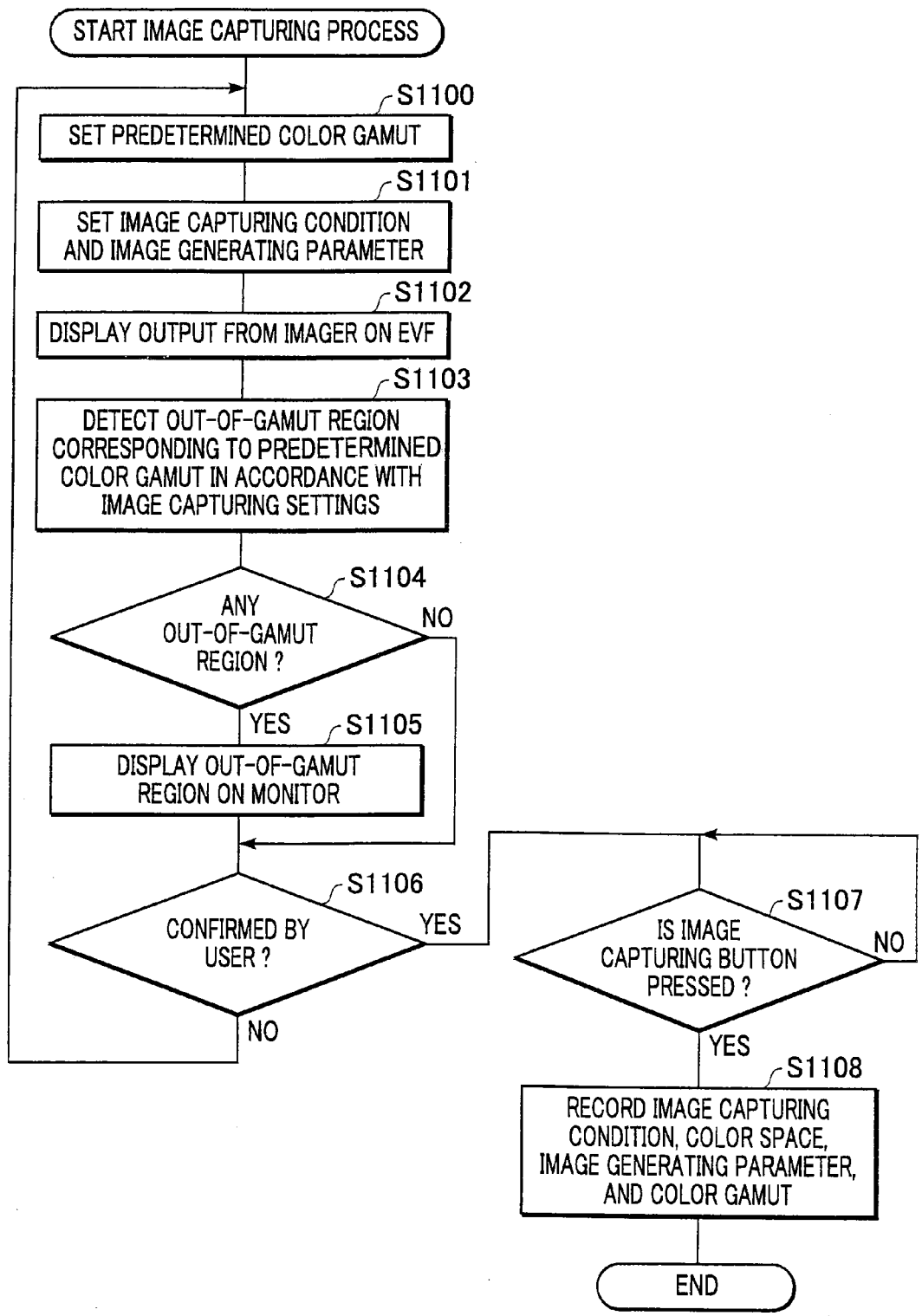

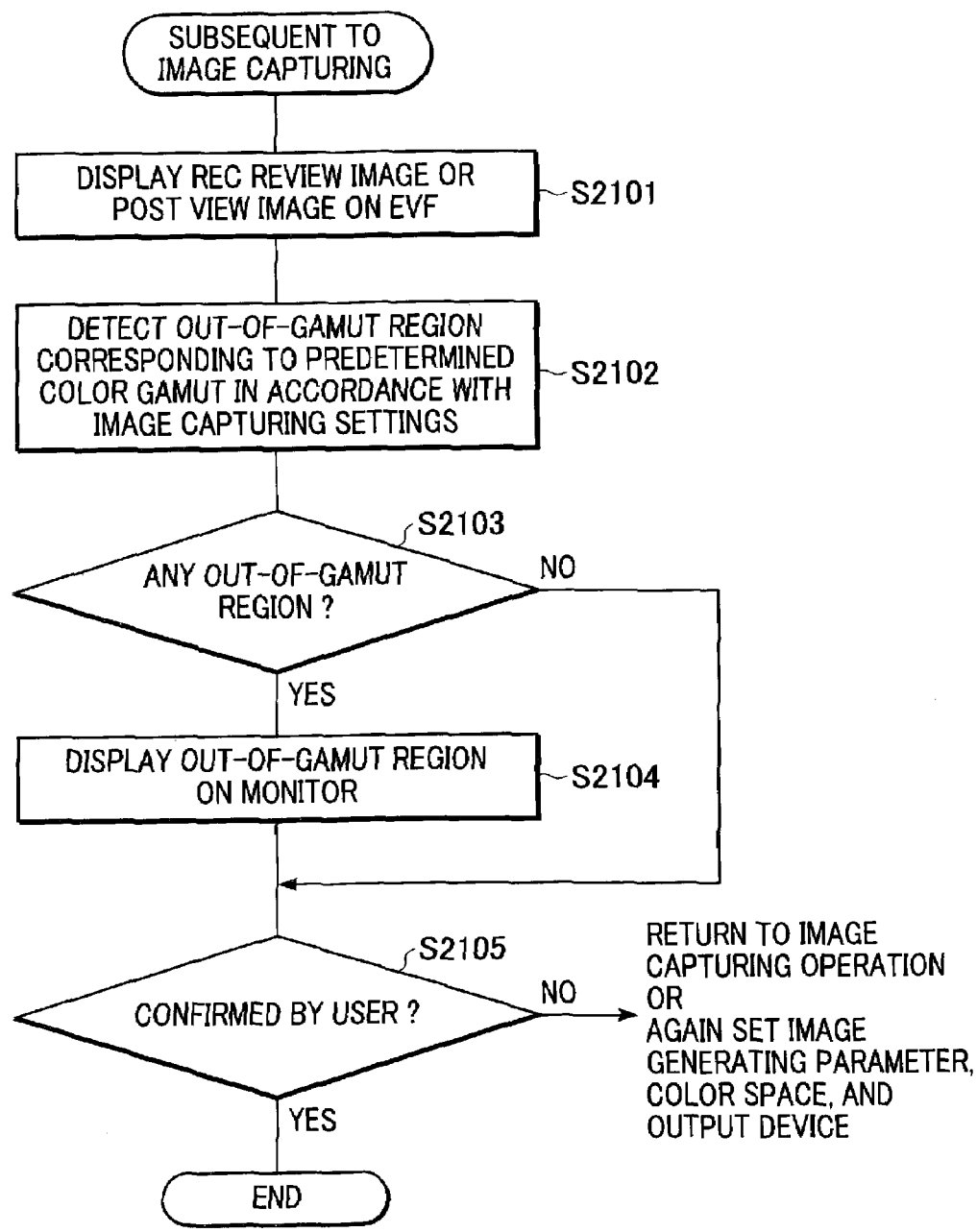

IMAGE CAPTURING APPARATUS AND METHOD, COMPUTER PROGRAM, AND COMPUTER-READABLE RECORDING MEDIUM THEREFOR

BACKGROUND OF THE INVENTION

1. Field of the Invention

The present invention relates to image capturing apparatuses and methods, computer programs, and computer-readable recording media therefor, and more particularly relates to an image capturing apparatus and method, a computer program, and a computer-readable recording medium therefor for use in capturing an image of a subject and generating or reproducing image data from the captured image.

2. Description of the Related Art

A color-space selecting method for use in known image capturing apparatuses will now be described using an example of a digital camera.

In known digital cameras, an sRGB color space is generally used to record images since most output devices including monitors and printers are optimized for sRGB.

Nowadays, it is said that the color gamut that can be represented by the sRGB color space is narrow. In order to solve this problem, the following techniques, which are roughly classified into two types, are employed.

A first technique is to prevent generation of a clipping effect. A typical technique of this type is esRGB proposed by Hewlett-Packard and the like to extend the color gamut of sRGB.

For example, it is assumed that a luminance signal Y is created by:

$$Y=0.3R+0.59G+0.11G \quad (1)$$

In this case, with respect to the luminance signal Y (Y=250), when increasing the chroma of a red hue, an R signal immediately reaches 255 and is not further increased no matter how hard it is tried to increase the chroma. Increasing the chroma by force produces a clipping effect where the R signal is clipped to 255. In the worse case, the hue may change, resulting in a color shift.

In contrast, esRGB has a luminance signal Y within the range of 0 to 255 (8 bits), whereas RGB signals are not limited to the range of 0 to 255. Specifically, esRGB extends the color gamut by allowing the R signal to be 256 or greater even when the luminance signal Y remains 250. In other words, esRGB extends the color gamut by allowing the individual RGB signals to be values other than 0 to 255.

The esRGB color space described above has just been proposed and has not been generally used yet.

A second technique employs a color space where the RGB tristimulus values are defined as values larger than those in sRGB. Such a color space may be, for example, NTSC (National Television System Committee), PAL/SECAM (Phase Alternate by Line/Sequential Couleur a Memoire), or Adobe RGB.

When an image recorded in a large color space, such as the above-described Adobe RGB, PAL/SECAM, or NTSC, is displayed on a regular sRGB monitor, the chroma is reduced to generate a less impressive image. In order to compensate for the reduction in the chroma, color space conversion must be performed. This requires additional processing and may cause conversion errors.

In order to avoid the necessity of color space conversion, the image must be displayed on an output device that is dedicated for each color space. Since Adobe RGB, PAL/SECAM, and NTSC represent extended color gamuts using the RGB signals within the range of 0 to 255, the accuracy with respect to the color gamut is more degraded than sRGB.

As described above, at present there is no color space that satisfies all factors. In such circumstances, as in high-end digital cameras, such as EOS-1D that has already been proposed by the assignee of the present invention, image recorders that can select a color space from among a plurality of color spaces are increasing in number.

When capturing an image of a subject in an extended color space by such a high-end digital camera, that is, when capturing an image of a subject with high chroma, NTSC or Adobe RGB is used to record the image. Otherwise, sRGB, which has high bit accuracy and which does not require subsequent color space conversion, is used. In this manner, the appropriate color space is selected and used in accordance with the application and/or the subject.

Similarly, one technique for adjusting the captured image to fit within the color gamut of the preset color space at the time the image is captured involves a method of adjusting image parameters. Specifically, for example, when capturing an image of a subject with high chroma, the image is captured with lower chroma and lower contrast (lower than the normal chroma and contrast). When capturing an image of a subject with low contrast and low chroma, the image is captured by increasing the contrast and chroma. In other words, the method adjusts the captured image to fit within the color gamut by changing image generating parameters, particularly tone and chroma parameters.

As in the case with the color space, this technique often requires additional retouching, after the image has been captured, for adjusting the contrast and chroma in accordance with the preferences of the person who has captured the image. It thus becomes necessary to appropriately select the contrast and chroma in accordance with the application and/or the subject.

As in the above-described method of adjusting the captured image to fit within the color gamut of the standard color space, a method is proposed for adjusting the color gamut of the captured image to optimally fit within the color reproduction range or color reproduction characteristics of an output device, such as a printer or a monitor. For example, when outputting an image of a subject with high chroma using a printer having a wide color reproduction range, the image remains unchanged and output as it is (with high chroma). In contrast, when outputting such an image using a printer having a narrow color reproduction range, the chroma and the contrast are suppressed and then the image is output. This technique is advantageous in a case in which the image is directly output without using a PC, e.g., in a case in which an image is captured by a camera and directly output from the camera to a specific printer.

Similarly, one technique for adjusting the captured image to fit within the color gamut of the preset color space at the time the image is captured is realized by a method involving changing the exposure. Specifically, for example, when an image of a subject with very high contrast is captured, high luminance portions and low luminance portions of the captured image are not transformed into gradations (tones). As a result, white elements in the high luminance portions and black elements in the low luminance portions are eliminated, causing color shifts. In order to capture an image whose high luminance portions fit within the color gamut, the exposure is reduced. In order to capture an image whose low luminance portions fit within the color gamut, the exposure is increased. This method is based on the fact that a color space has narrower color gamuts in high and low luminance portions and wider color gamuts in intermediate luminance portions. Such characteristics apply equally to a standard color space and to the individual color gamuts of devices and the like. This method requires the user to determine the exposure at the time the image is captured. The user must determine whether or not the captured image falls within the color space at the time the image is captured.

Using the above-described known technology, it is difficult to detect a color space that is most appropriate to a subject whose image is being captured. Therefore, it is very difficult to select the most appropriate color space.

In other words, with the above-described known technology, the user must use one color space and forget about the other wider color spaces, or the user must make efforts to perform color space conversion while accepting the accuracy degradation.

Similarly, when selecting the image generating parameters, it is difficult to select the most appropriate image generating parameters for a subject whose image is being captured.

Similarly, when selecting the most appropriate color space and image generating parameters for the color reproduction range and color reproduction characteristics of a specific output device, it is difficult to select the most appropriate image generating parameters for a subject whose image is being captured.

Similarly, when selecting the most appropriate exposure for the color reproduction range and color reproduction characteristics of a specific color space and/or a specific output device, it is difficult to select the most appropriate image capturing conditions for a subject whose image is being captured.

SUMMARY OF THE INVENTION

In view of the above-described problems, it is an object of the present invention to provide an image capturing apparatus and method for enabling a user to confirm an out-of-gamut region of a captured image in a predetermined color space in accordance with an image capturing condition and to easily select an optimal color space.

In order to achieve the foregoing objects, according to an aspect of the present invention, there is provided an image capturing apparatus for generating, from a captured image created by capturing an image of a subject in accordance with an image capturing condition specified by a user, image data represented in a predetermined color space selected from among a plurality of color spaces. The image capturing apparatus includes a detector which detects, from the image data, an out-of-gamut region falling outside the color gamut of the predetermined color space in accordance with the image capturing condition; and an out-of-gamut-region display unit which displays the out-of-gamut region.

In order to achieve the foregoing objects, according to another aspect of the present invention, there is provided an image capturing method of generating, from a captured image created by capturing an image of a subject in accordance with an image capturing condition specified by a user, image data represented in a predetermined color space selected from among a plurality of color spaces. The image capturing method includes detecting, from the image data, an out-of-gamut region falling outside the color gamut of the predetermined color space in accordance with the image capturing condition; and displaying the out-of-gamut region.

Another object of the present invention is to provide an image capturing apparatus and method for enabling a user to estimate an image output result by confirming an out-of-gamut region in accordance with the color reproduction range of an output device and to easily select an optimal image generating parameter and/or image capturing condition.

In order to achieve the foregoing objects, according to a further aspect of the present invention, there is provided an image capturing apparatus for generating, from an image created by capturing an image of a subject in accordance with an image capturing condition specified by a user, a captured image represented in a predetermined color gamut. The image capturing apparatus includes an image-output-device selector which selects an image output device for outputting the captured image; a detector which detects an out-of-gamut region falling outside the reproducible color gamut of the image output device; and an out-of-gamut-region display unit which displays the out-of-gamut region detected by the detector along with the captured image.

In order to achieve the foregoing objects, according to yet another aspect of the present invention, there is provided an image capturing method of generating, from an image created by capturing an image of a subject in accordance with an image capturing condition specified by a user, a captured image represented in a predetermined color gamut. The image capturing method includes selecting an image output device for outputting the captured image; detecting an out-of-gamut region falling outside the reproducible color gamut of the image output device; and displaying the detected out-of-gamut region along with the captured image.

Another object of the present invention is to provide an image capturing method for enabling a user to easily select an optimal image capturing condition for generating an image that fits within a predetermined color gamut by detecting, from a captured image, an out-of-gamut region that falls outside the predetermined gamut in accordance with the image capturing condition.

In order to achieve the foregoing objects, according to another aspect of the present invention, there is provided an image capturing method including a first display step of displaying a captured image; an image capturing parameter setting step of setting, in the first display step, an image capturing parameter of a subsequently captured image; and an out-of-gamut determining step of determining whether or not the captured image fits within a predetermined color gamut in accordance with the parameter in the image capturing parameter setting step.

Another object of the present invention is to provide an image capturing apparatus for generating, from a captured image, optimal image data that fits within a predetermined color gamut by causing a user to confirm an out-of-gamut region, which is part of the captured image, falling outside the predetermined color gamut.

In order to achieve the foregoing objects, according to a further aspect of the present invention, there is provided an image capturing apparatus including an image capturing unit which captures an image of a subject and to output a captured image signal; an A/D converter which A/D-converts the captured image signal and to output image data; a storage unit which temporarily stores the image data generated by the A/D converter; a compressor which compresses the image data stored in the storage unit; an image data input/output unit which writes the image data compressed by the compressor into a recording medium or to read the image data from the recording medium; an out-of-gamut determining unit which determines whether the image data fits within a predetermined color gamut; and an out-of-gamut-region display unit which displays an out-ofgamut region, which is part of the image data, falling outside the predetermined color gamut.

According to the present invention arranged as described above, an image of a subject is captured in accordance with an image capturing condition specified by a user. In accordance with the image capturing condition or an image generating parameter, an out-of-gamut region falling outside a predetermined color gamut, which is selected from among a plurality of color gamuts, is detected and displayed in a captured image generated in the predetermined color gamut. When the image contains numerous out-of-gamut regions, the user changes the setting immediately on the spot. The user thus easily selects an optimal image capturing condition, color space, and/or image generating parameter for the captured image and/or an output device having an optimal color reproduction range.

Determination of whether or not the color gamut set to the captured image is appropriate is made possible by displaying the out-of-gamut region along with an EVF image output from an imager. Accordingly, whether or not the color gamut is most appropriate for recording the image is determined at the time the image is captured. By changing the settings, optimal image data that fits within a predetermined color gamut is generated.

By displaying an out-of-gamut region that is detected in accordance with an image capturing condition and/or image generating parameter set at the time the image is captured, the user confirms the out-of-gamut region of a captured image recorded on a recording medium or the like after the image has been captured and selects an optimal image generating parameter and/or output device.

Further objects, features, and advantages of the present invention will become apparent from the following description of the preferred embodiments with reference to the attached drawings.

BRIEF DESCRIPTION OF THE DRAWINGS

FIG. 5 is a block diagram of an example of the circuit configuration of an image capturing apparatus according to first to third embodiments of the present invention.

FIG. 10 is a table showing a printer's color reproduction range characteristics according to the third embodiment.

FIG. 12 is a flowchart showing an example of a process according to the first to third embodiments.

FIG. 13 is a flowchart showing an example of a process according to the first to third embodiments.

DESCRIPTION OF THE PREFERRED EMBODIMENTS

First Embodiment

With reference to the accompanying drawings, an image capturing apparatus and method, a computer program, and a computer-readable recording medium according to a first embodiment of the present invention will now be described.

Figure 1A:
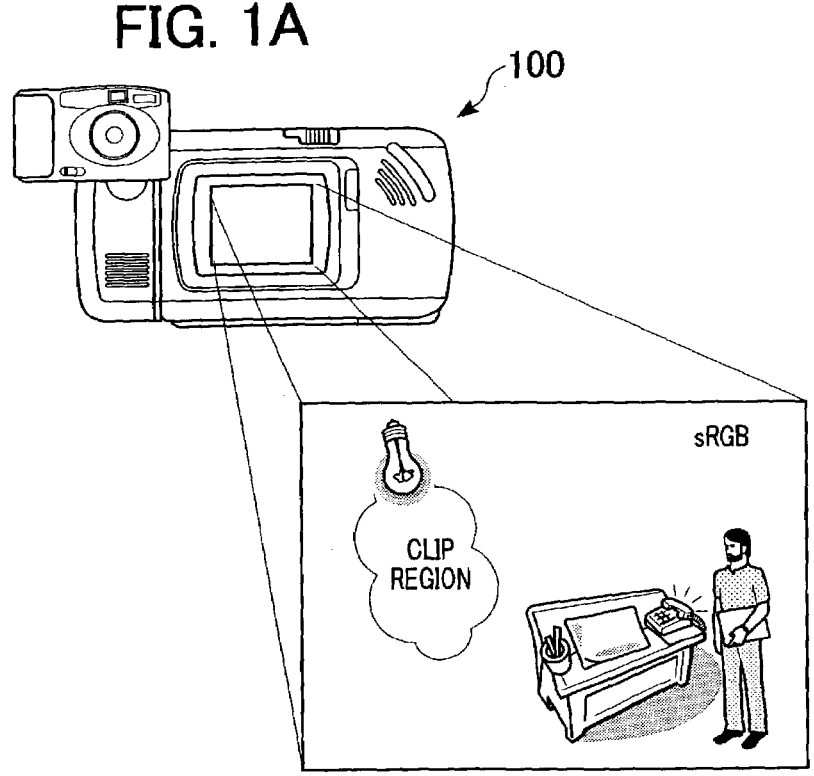
FIGS. 1A and 1B are illustrations of the concept of specifying a color space according to a first embodiment of the present invention.
Figure 1B:
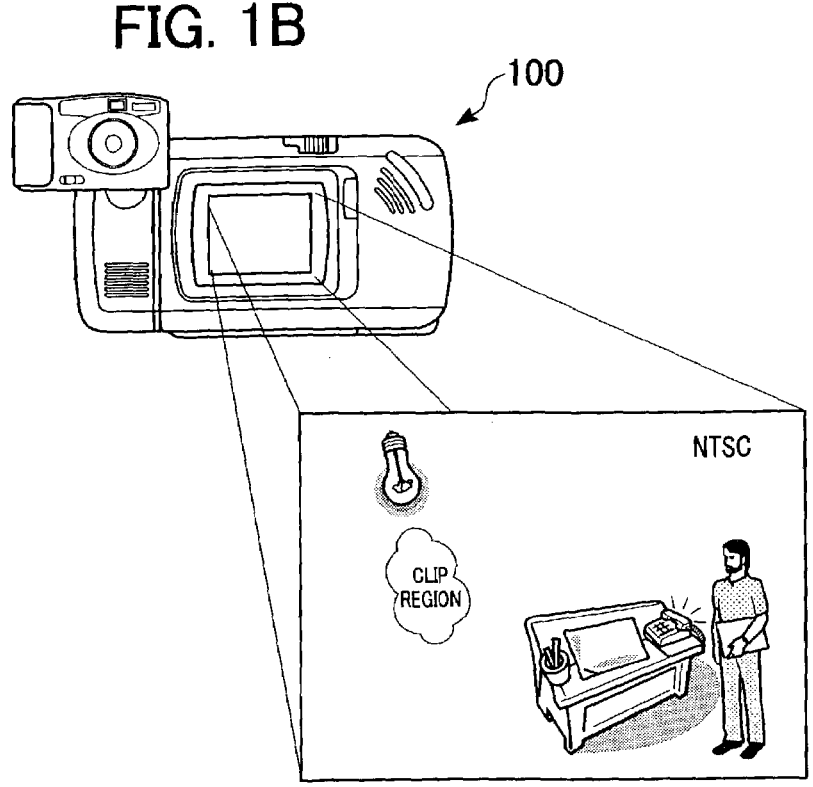

FIGS. 1A and 1B illustrate the concept of specifying a color space using an image capturing apparatus 100 according to the first embodiment. The color gamut refers to:

1) the range of colors that can be reproduced, which differs according to the color space; and
2) the color reproduction range and color reproduction characteristics, which differ depending on the output device. FIGS. 1A and 1B each show a region outside a preset color space (out-of-gamut region) on a camera's monitor (monitor 110, which is provided to serve as a display, of the image capturing apparatus 100).

FIG. 1A shows a case in which sRGB is selected as a preset color space. FIG. 1B shows a case in which NTSC is selected as a preset color space.

Since the NTSC color space is larger than the sRGB color space, as shown in FIGS. 1A and 1B, an out-of-gamut region (clip region) is smaller in NTSC than in sRGB.

Figure 3:
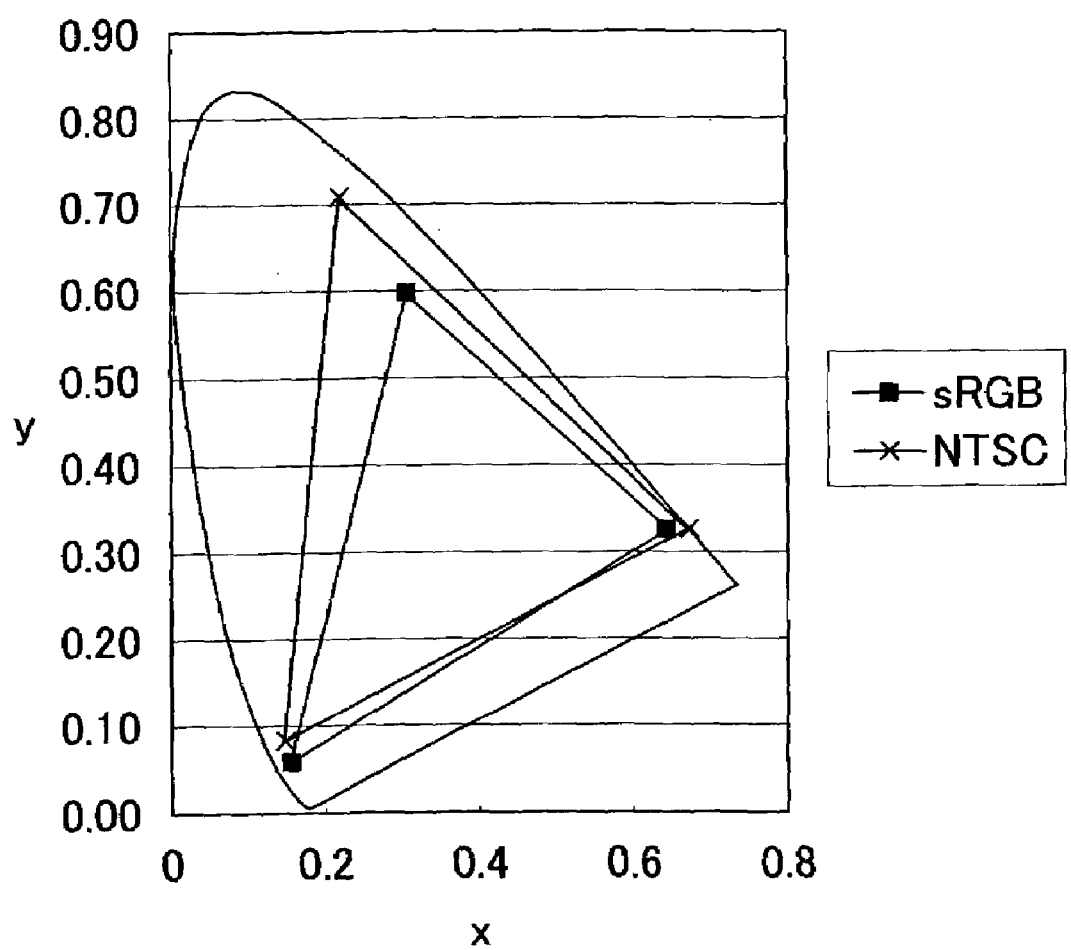
FIG. 3 is a diagram showing the color gamuts of NTSC and sRGB according to the first embodiment.

FIG. 3 is a diagram showing color gamuts of the color spaces (sRGB and NTSC) selected by the image capturing apparatus 100 of the first embodiment. Specifically, FIG. 3 is an xy chromaticity diagram in the CIE XYZ calorimetric system of the color gamuts of the sRGB and NTSC color spaces. As is clear from the diagram, the NTSC color space has a wider color gamut particularly in the green direction.

Figure 2:
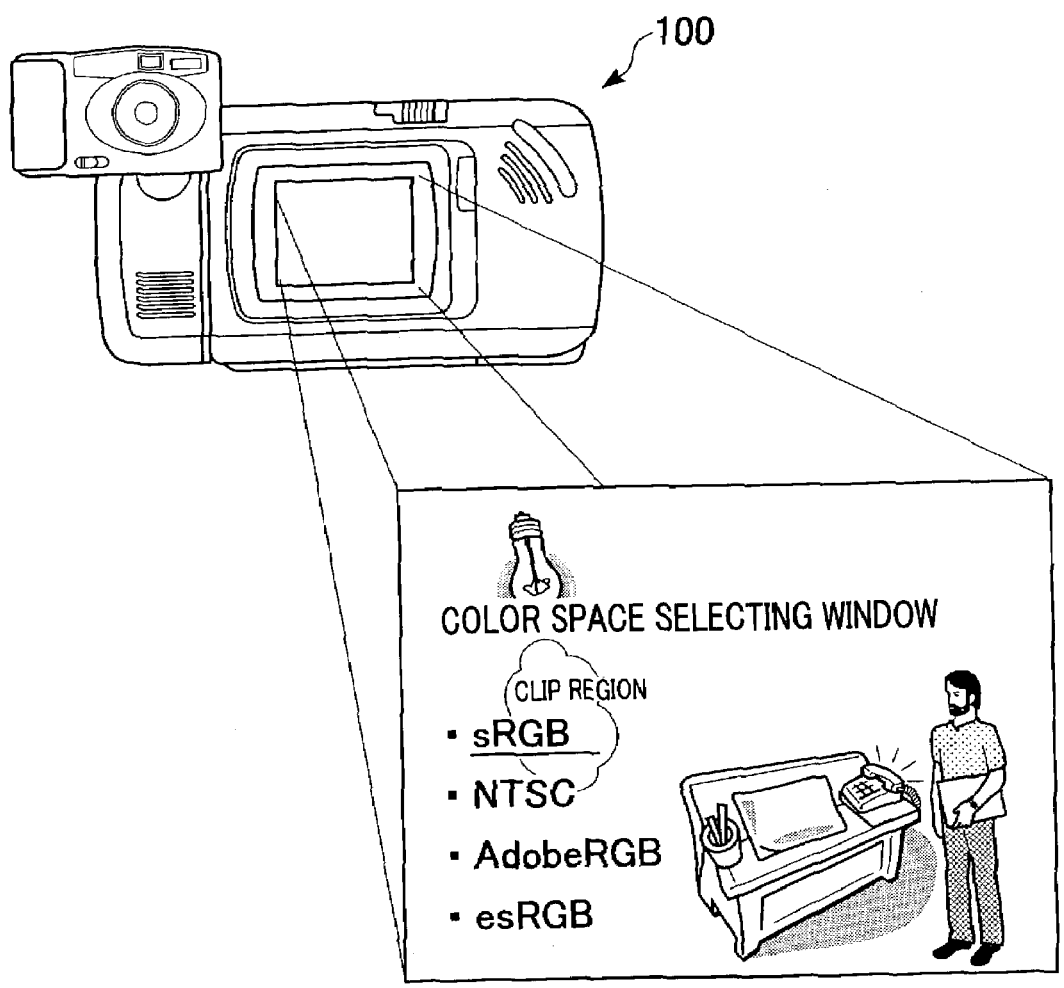
FIG. 2 is an illustration of an example of a color space selecting window displayed on a monitor according to the first embodiment.

FIG. 2 is an illustration of an example of a color space selecting window displayed on the monitor 110.

Referring to FIG. 2, the most appropriate color space is easily selected by displaying the out-of-gamut region on the monitor 110.

The circuit configuration of the image capturing apparatus 100 according to the first embodiment will now be described. FIG. 5 is a block diagram of an example of the circuit configuration of the image capturing apparatus 100 according to the first embodiment.

Referring to FIG. 5, a signal output by an imager 101 is generated as an image by a signal processor 102, and the image is stored as a captured image in a buffer memory 103.

In a case in which the image is recorded on a recording medium 106, the captured image in the buffer memory 103 is sent to a compression/decompression circuit 104 and compressed. The compressed image is written by a read/write unit 105 to the recording medium 106. Thus, the image is recorded.

At the same time, the captured image stored in the buffer memory 103 is sent to a display controller 108 as an image to be displayed (display image) on an electronic view finder (EVF). An out-of-gamut region is extracted from the image stored in the buffer memory 103 by an out-of-gamut-region extracting circuit 107 and sent as an out-of-gamut-region extracted image to the display controller 108.

The display image and the out-of-gamut-region extracted image are merged by the display controller 108 into a merged image, and the merged image is converted into an image to be displayed on the monitor 110. The converted image is subjected to D/A conversion by a D/A converter 109, and the resultant image is displayed on the monitor 110. With this circuit configuration, the out-of-gamut region outside the color gamut of the color space specified by a user is displayed. When a different color space is selected by the user via a user interface 112, a system controller 111 reads a parameter set associated with the color space from a data memory 113 and sets the parameter set to the signal processor 102.

A method of determining the out-of-gamut region, which is performed by the out-of-gamut-region extracting circuit 107, will now be described.

The JPEG (Joint Photographic Experts Group) format is used as the output format of general digital cameras. The JPEG format stores color information in YCrCb format.

Conversion from RGB format into YCrCb format is defined by:

$$Y=0.3000*R+0.5900*G+0.1100*B \quad (2)$$

$$Cr=(R-Y)*0.713 \quad (3)$$

$$Cb=(B-Y)*0.564 \quad (4)$$

where Y is a luminance signal, R is an R (red) signal, G is a G (green) signal, B is a B (blue) signal, Cr is a chrominance signal (=R signal−luminance signal), and Cb is a chrominance signal (=B signal−luminance signal).

In contrast, conversion from YCrCb format into RGB format is defined by:

$$R=Y+1.40*Cr \quad (5)$$

$$B=Y-0.71Cr=0.33Cb \quad (6)$$

$$G=Y+1.77*Cb \quad (7).$$

Using specific numerals, conversion from YCrCb format into RGB format will now be described.

For example, when the luminance signal Y is 106, the chrominance signal Cr is 103, and the chrominance signal Cb is −49, equations (5) to (7) yield to the result that R signal=250, G signal=50, and B signal=20:
(Y,Cr,Cb)=(106,103,−49)→(R,G,B)=(250,50,20)

With respect to this color, when a subject has high chroma, e.g., when the chrominance signals Cr and Cb are 1.5 times higher than the above described Cr and Cb, the result is that R signal=322, G signal=21, and B signal=−25:
(Y,Cr,Cb)=(106,154,−74)→(R,G,B)=(322,21,−25)

As is clear from this example, even in a case in which the luminance signal Y is within the range of 0 to 255, when a subject has high chroma, the R signal, the G signal, and the B signal may not be within the range of 0 to 255. This means that the captured image does not fit within the color gamut of a specified color space.

In the first embodiment, whether or not the captured image fits within the color gamut of the specified color space is determined as follows. Specifically, the luminance signal Y, the chrominance signal Cr, and the chrominance signal Cb (YCrCb data) are converted into the R signal, G signal, and B signal (RGB data). Subsequently, it is determined whether or not all the R signal, G signal, and B signal (RGB data) fit within the range of 0 to 255. If the RGB data does not fit within the range of 0 to 255 and thus the image is out of the color gamut, the monitor 110 displays that the image is out of the color gamut.

The fact that the image is out of the color gamut may be indicated by causing the out-of-gamut region to flash on and off. Alternatively, the out-of-gamut region is represented by the broken lines. Alternatively, warning text or the like is displayed.

When the captured image contains numerous out-of-gamut regions (clip regions) outside the color gamut of the preset color space, the user immediately changes, on the spot, the color space setting by specifying the color space via the user interface 112. As discussed above, displaying the out-of-gamut region(s) outside the color gamut of the color space enables determination of whether or not the specified color space is appropriate, in particular determination of whether or not the specified color space is most appropriate for recording the image. Accordingly, the captured image in the most appropriate color space is realized.

Although the cases of NTSC and sRGB color spaces are described in the first embodiment, other color spaces may be used. For example, Adobe RGB, PAL/SECAM, or esRGB may be used.

Adobe RGB is a color space used by, for example, Photoshop, which is retouching software manufactured by Adobe. Adobe RGB is widely used in printing industry and the like.

The chromaticity points in the Adobe RGB color space are:
R (0.64, 0.33);
G (0.21, 0.71); and
B (0.15, 0.06).

The chromaticity points in the SRGB color space are:
R (0.64, 0.33);
G (0.3, 0.6); and
B (0.15, 0.06).

The chromaticity points in the NTSC color space are:
R (0.67, 0.33);
G (0.21, 0.71); and
B (0.14, 0.08).

Figure 6:
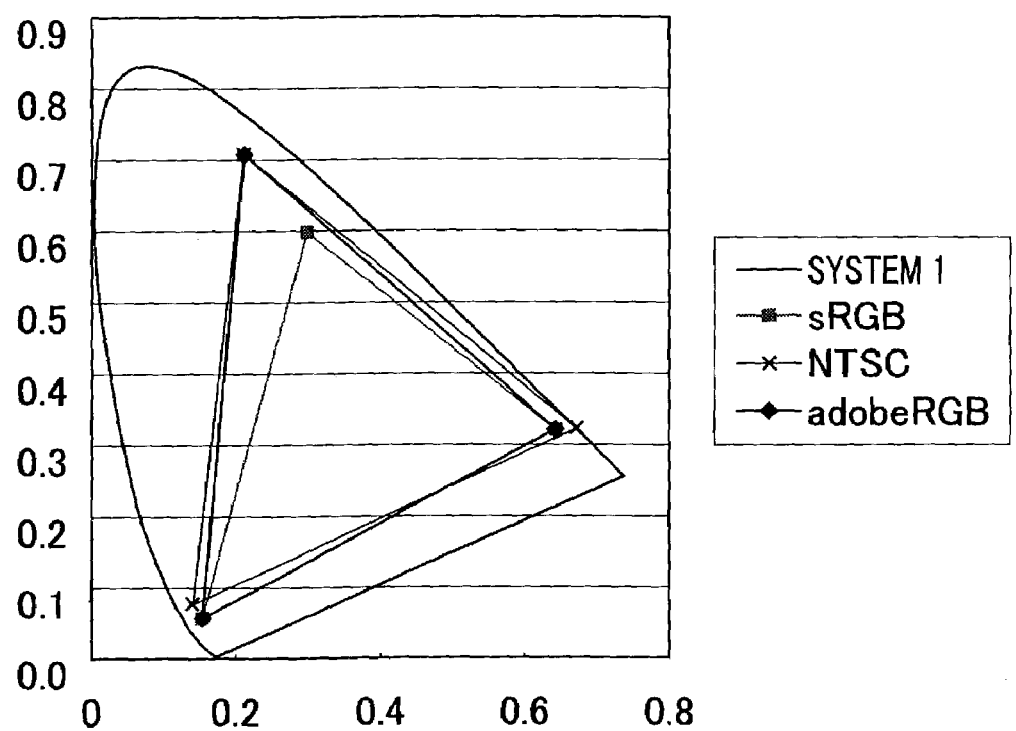
FIG. 6 is a diagram showing the color gamuts of NTSC, sRGB, and Adobe RGB according to the first embodiment.

FIG. 6 shows the color gamuts of the sRGB, NTSC, and Adobe RGB color spaces.

By using esRGB, Adobe RGB, or PAL/SECAM having a wide color gamut, the out-of-gamut region (clip region) outside the color gamut of the color space is reduced. As a result, the number of times the user must select the color space to determine the most appropriate color space is reduced.

As in the first embodiment, displaying the out-of-gamut region(s) outside the color gamut of the preset color space on the EVF at the time the image is captured (in a state in which the signal is output by the imager) enables determination of the most appropriate color space at the time the image is captured.

In the first embodiment, the most appropriate color gamut and/or color space are selected at the time the image is captured using the EVF in a state in which the signal is output by the imager. Alternatively, the out-of-gamut region is displayed at the time of "rec review" in which the captured image is displayed for a predetermined period of time after the image has been captured. Alternatively, the out-of-gamut region is displayed at the time of "post view" in which captured image is read from a recording medium or the like after the image has been captured. In other words, the processing similar to the above can be performed when the out-of-gamut region is displayed at the time of "rec review" or "post view" after the image has been captured. When the recorded image contains numerous out-of-gamut regions (clip regions) outside the color gamut of the color space specified at the time the image is captured, the out-of-gamut regions are displayed to enable the user to immediately change, on the spot, the color space setting for the recorded image.

Displaying the out-of-gamut region(s) outside the color gamut of the color space makes it easier for the user to perform determination of whether or not the color space set to the recorded image is appropriate. Accordingly, the recorded image is generated or developed in the most appropriate color space.

As discussed above, in the first embodiment, determination of whether or not the entire RGB data is within the range of 0 to 255 at the time or after the image of the subject is captured enables detection of the out-of-gamut region(s) outside the color gamut of the preset color space from the image of the subject, and the detected out-of-gamut region(s) is displayed on the screen. The user easily selects the most appropriate color space on the basis of the displayed out-of-gamut region(s). Using the image capturing apparatus 100 of the first embodiment, the color space most appropriate to the subject is easily selected.

When a captured image contains numerous out-of-gamut regions outside the color gamut of the color space selected by the user, the user immediately changes, on the spot, the color space setting.

As discussed above, displaying the out-of-gamut region(s) outside the color gamut of the color space enables the user to determine whether or not the color space specified for recording the image of the subject is appropriate. In particular, displaying the out-of-gamut region(s) on the EVF enables determination of the color space most appropriate for recording the captured image at the time the image is captured.

According to the first embodiment, displaying the out-of-gamut region(s), particularly on the EVF, enables the user to determine the color space most appropriate for recording the captured image at the time the image is captured.

Second Embodiment

With reference to the accompanying drawings, a second embodiment of the present invention will now be described. The hardware configuration of an image capturing apparatus of the second embodiment is similar to that of the image capturing apparatus 100 of the first embodiment. Specifically, the item set by the user differs between the image capturing apparatus of the second embodiment and the image capturing apparatus 100 of the first embodiment. The same reference numerals are given to components corresponding to those of the first embodiment, and repeated descriptions of the common portions are omitted.

Figure 4A:
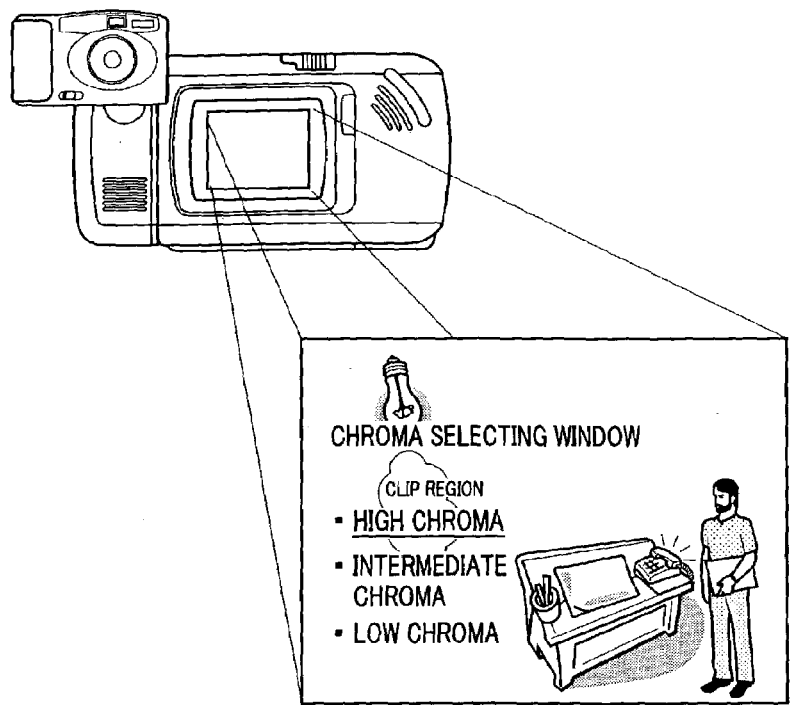
FIGS. 4A and 4B are illustrations of an example of an image generating parameter selecting window displayed on the monitor according to a second embodiment of the present invention.
Figure 4B:
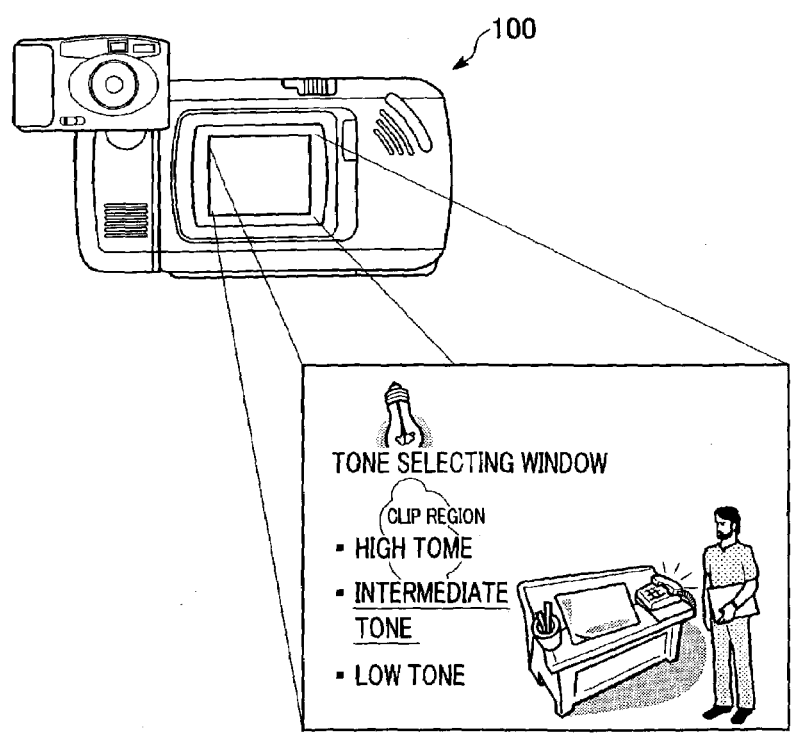

FIGS. 4A and 4B show examples of an image generating parameter selecting window displayed on the monitor 110 of the image capturing apparatus 100 of the second embodiment.

As described above, the circuit configuration of the image capturing apparatus 100 of the second embodiment is similar to that of the first embodiment, and repeated descriptions of the common portions are omitted. Only differences between the first and second embodiments will now be described.

According to the first embodiment, the item set by the user via the user interface 112 is the color space. According to the second embodiment, an image generating parameter (image parameter) is set by the user. The image generating parameter is to adjust the quality (such as chroma or tone) of a captured image. More specifically, the image generating parameter is to adjust the quality of a captured image read from the buffer memory 103 shown in FIG. 5 at the time the image is captured.

In addition to the image generating parameter, the user may set an image capturing condition at the time the image is captured. For example, the user may set the exposure, photometric value, ranging position, white balance at the time the image is captured, or the like. The exposure may be set by setting the ISO speed at the time the image is captured or by controlling the output gain of the imager. The ISO speed may be set prior to or subsequent to white balancing.

Using numeric values, a specific example will now be described in which a captured image does not fit within the color gamut when chroma is increased on the basis of an instruction from the user.

For example, when the luminance signal Y is 106, the chrominance signal Cr is 103, and the chrominance signal Cb is −49, the above-described equations (5) to (7) yield to the result that R signal=250, G signal=50, and B signal=20:
(Y,Cr,Cb)=(106,103,−49)→(R,G,B)=(250,50,20).

When the subject has a parameter for increasing chroma, e.g., when chroma enhancement is performed to increase the chrominance signals Cr and Cb 1.5 times the above described Cr and Cb, the result is that R signal=322, G signal=21, and B signal=−25:
(Y,Cr,Cb)=(106,154,−74)→(R,G,B)=(322,21,−25).

As is clear from this example, even in a case in which the luminance signal Y is within the range of 0 to 255, with the parameter for increasing chroma, the R, G, and B signal values (RGB values) may not be within the range of 0 to 255.

In this case, when the R, G, and B signal values (RGB values) are displayed unaltered on a personal computer (PC) or the like, the R signal is 255, the G signal is 21, and the B signal is −25:
(R,G,B)=(322,21,−25)→(R,G,B)=(255,21,0).

When the chroma of a captured image whose chroma has not yet been increased is increased, the hue changes distinctively, causing inconvenience.

According to the second embodiment, referring to FIG. 4A, an out-of-gamut region is displayed on the screen of the monitor 110 at the time the image is captured. This makes it easier for the user to select an appropriate value for the image generating parameter (chroma parameter for adjusting the chroma).

As described above, according to the second embodiment, the out-of-gamut region (clip region) is displayed to enable the user to easily select the image generating parameter (e.g., chroma parameter). Even when a captured image contains numerous out-of-gamut regions, image generating parameters are changed immediately on the spot. The user immediately adjusts, on the spot, the image quality (e.g., chroma) to an appropriate value on the basis of the displayed content. Accordingly, the image generating parameter most appropriate for the image of the subject, in particular, the image generating parameter most appropriate for recording the image of the subject, is easily set. Therefore, image data on the subject is generated or developed easily and appropriately.

According to the second embodiment, a case in which the chroma parameter serving as the image generating parameter is selected. Alternatively, referring to FIG. 4B, a tone parameter may be selected. Alternatively, other image generating parameters may be selected. In other words, any image parameter (image generating parameter) for adjusting the image quality may be selected.

In the second embodiment, in order that the user can select the image generating parameter (image parameter), the out-of-gamut region may be displayed not only on the EVF (at the time the image is captured) but also at the time of "rec review" displayed after the image has been captured or at the time of "post view" observed after the image has been captured. The image generating parameter may include any parameter for adjusting the image quality (e.g., chroma or tone) of a recorded image read from the recording medium 106 shown in FIG. 5.

More specifically, after the image has been captured, when the recorded image contains numerous out-of-gamut regions (clip regions) outside the color gamut of the color space, the out-of-gamut regions are displayed to enable the user to immediately adjust, on the spot, the settings of the image generating parameters.

As described above, displaying the out-of-gamut regions outside the color gamut of the color space makes it easier for the user to perform determination of whether or not the image generating parameters set to the recorded image are appropriate. The recorded image is thus generated or developed in the most appropriate color space.

Displaying the out-of gamut region(s) enables determination of whether or not the image parameter set to the subject is appropriate. In particular, displaying the out-of-gamut region(s) on the EVF enables determination of the image generating parameter most appropriate for recording the image at the time the image is captured.

Third Embodiment

Figure 9:
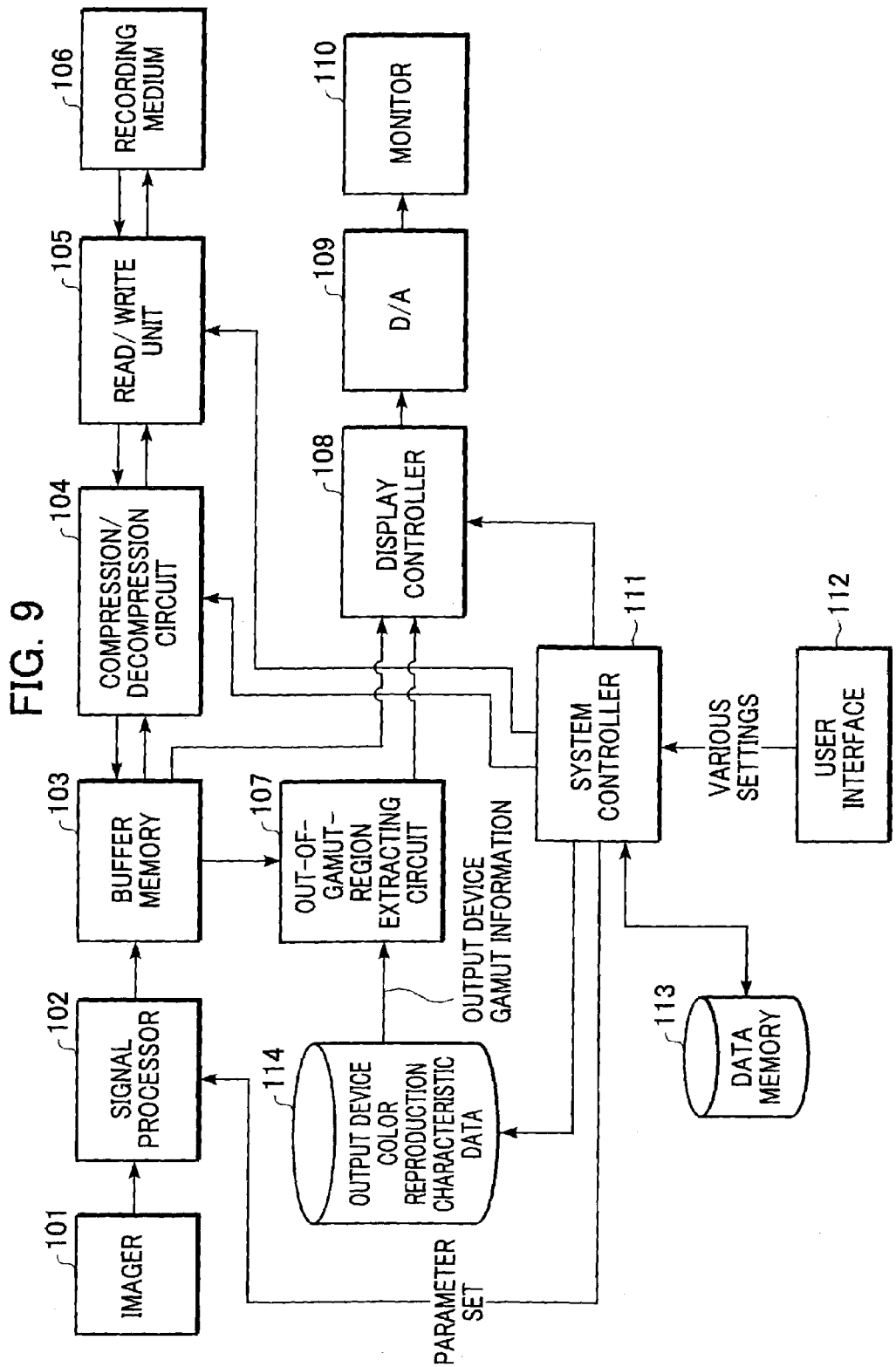
FIG. 9 is a block diagram of an example of the circuit configuration of the image capturing apparatus according to the third embodiment.

With reference to the accompanying drawings, a third embodiment of the present invention will now be described. FIG. 9 is a block diagram showing signal processing units of an image capturing apparatus according to the third embodiment. The circuit configuration of an image capturing apparatus 100 according to the third embodiment is similar to that of the first embodiment, and repeated descriptions of the common portions are omitted. Only differences between the first and third embodiments will now be described.

Referring to FIG. 9, an output device is set through the user interface 112. In accordance with the type of the preset output device, the color reproduction characteristics are selected from output device color reproduction characteristic data 114 and output as output device color gamut information to the out-of-gamut-region extracting circuit 107. The out-of-gamut-region extracting circuit 107 compares the output device color gamut information with image data from the buffer memory 103 and extracts an out-of-gamut region.

Although the output device color reproduction characteristic data is maintained in the image capturing apparatus, the output device color reproduction characteristic data may be obtained by a communication unit when a connection is established between the image capturing apparatus and the output device, such as a monitor or a printer. Accordingly, the color reproduction characteristic data in accordance with each output device is obtained as it becomes necessary. Alternatively, the color reproduction characteristic data may be read from a removable recording medium or the like. The selection of the color reproduction characteristic data may be done by storing a plurality of pieces of color reproduction characteristic data on a recording medium and selecting one from among the plural pieces of color reproduction characteristic data. Alternatively, a different piece of color reproduction characteristic data may be stored on each recording medium. One recording medium may be replaced with another, and the color reproduction characteristic data may be read therefrom.

Figure 7:
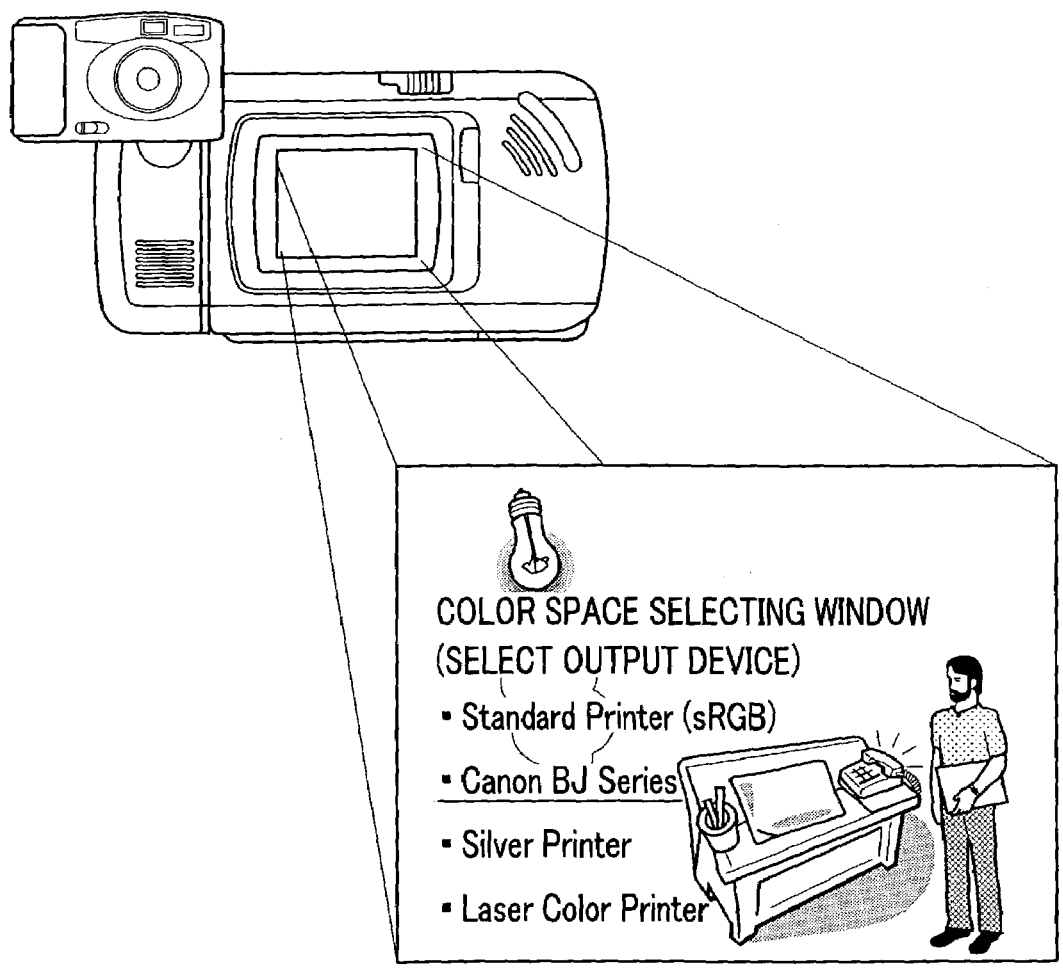
FIG. 7 is an illustration of an example of an output device selecting window displayed on the monitor according to the third embodiment.

FIG. 7 illustrates an example of an output device selecting window displayed on the monitor 110 of the image capturing apparatus 100. According to the first embodiment, the item set by the user via the user interface 112 is the color space. According to the third embodiment, the item set by the user is the output device.

Figure 8:
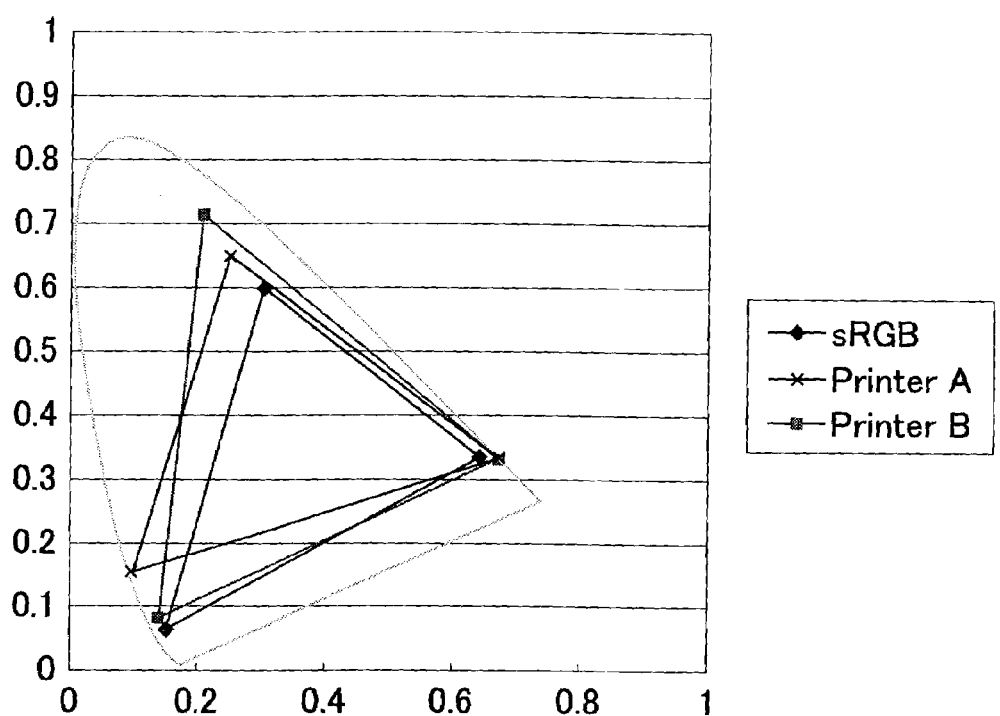
FIG. 8 is a diagram showing an example of the differences between the color reproduction ranges of output devices according to the third embodiment.

FIG. 8 is a conceptual diagram showing the differences in range of reproducible colors depending on the output device. In general, the color reproduction range differs between devices such as a printer and a monitor. Also, the color reproduction range differs between printers depending on the type of ink, the printing method, such as sublimation printing or ink-jet printing, etc. By displaying the color reproduction range depending on the output device at the time the image is captured, the user who has captured the image is enabled to estimate the image output result. Therefore, the user can easily select the image generating parameter, the exposure condition, or the like at the time the image is captured.

Figure 11:
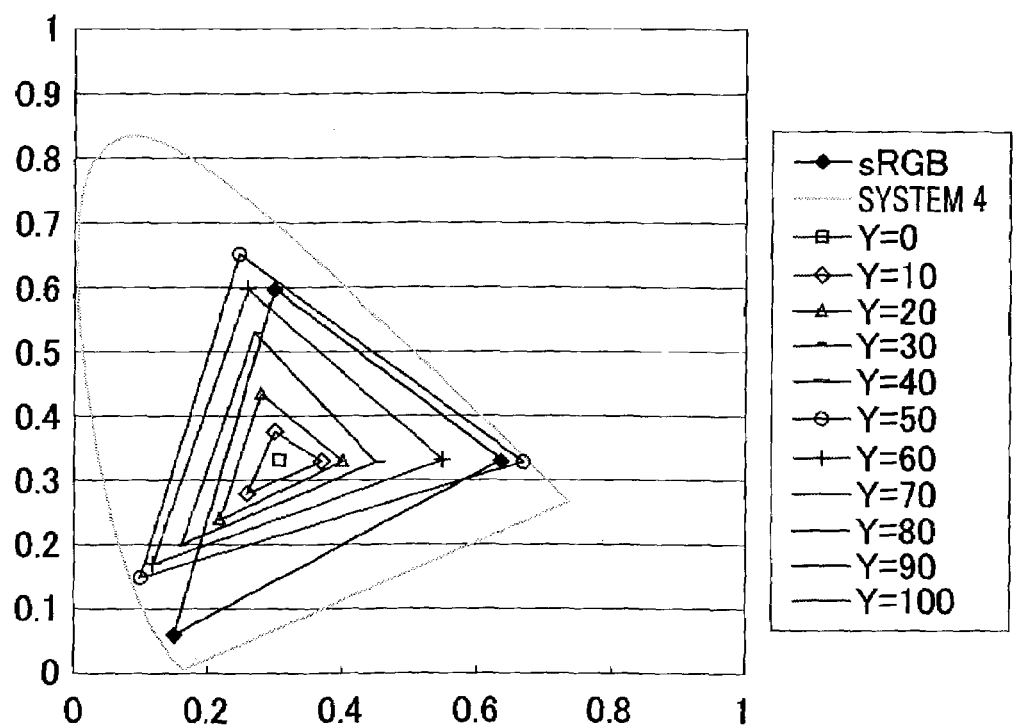
FIG. 11 is a chromaticity diagram showing an example of the printer's color reproduction range characteristics according to the third embodiment.

FIG. 10 shows the color reproduction range characteristics of a selected output device. FIG. 11 is a chromaticity diagram of the color reproduction range characteristics. In this example, the color reproduction range of the output device is represented by a triangle whose vertices indicate three chromaticity values for each luminance.

According to the third embodiment, the colors are represented using the CIEXYZ (Y,x,y) color model. Alternatively, the colors may be represented by the CIE L*a*b model or by any other colorimetric model.

Although the luminance values in the third embodiment are in ten steps, the reproduction range may be specified using luminance values in smaller steps. Alternatively, the reproduction range may be estimated by interpolating between steps.

A method of determining an out-of-gamut region by the out-of-gamut-region extracting circuit 107 will now be described. The following is a transform of a signal in the sRGB color space from CIEXYZ system to Yxy system:

$RsRGB' = R8bit \div 255$ $GsRGB' = G8bit \div 255$ $BsRGB' = B8bit \div 255$ if $RsRGB = RsRGB' \div 12.92$, $RsRGB' \leq 0.03928$ $GsRGB = GsRGB' \div 12.92$, $GsRGB' \leq 0.03928$ $BsRGB = BsRGB' \div 12.92$, $BsRGB' \leq 0.03928$ else $RsRGB = ((RsRGB' + 0.055) \div 1.055)^{\wedge}(2.4)$, $RsRGB' > 0.03928$ $GsRGB = ((GsRGB' + 0.055) \div 1.055)^{\wedge}(2.4)$, $GsRGB' > 0.03928$ $BsRGB = ((BsRGB' + 0.055) \div 1.055)^{\wedge}(2.4)$, $BsRGB' > 0.03928$ $$\begin{bmatrix} X' \\ Y' \\ Z' \end{bmatrix} = \begin{bmatrix} 0.4124 & 0.3576 & 0.1805 \\ 0.2126 & 0.7152 & 0.0722 \\ 0.0193 & 0.1192 & 0.9505 \end{bmatrix} \begin{bmatrix} R_{sRGB} \\ G_{sRGB} \\ B_{sRGB} \end{bmatrix} \quad (8)$$

$X = 100 \times X'$ $Y = 100 \times Y'$ $Z = 100 \times Z'$ $x = \dfrac{X}{X+Y+Z}, \quad y = \dfrac{Y}{X+Y+Z}.$ Using the transform, RGB values are transformed into Yxy values. When the Yxy values are within the color gamut shown in FIG. 10, it is determined that the Yxy values are within the color gamut. If not, it is determined that the Yxy values fall outside the color gamut. As described above, displaying the color reproduction range depending on the output device, such as a printer or a monitor, at the time the image is captured enables the user who has captured the image to estimate the image output result. It thus becomes easier for the user to select the image generating parameter or the image capturing condition such as the exposure at the time the image is captured.

Using the flowchart of FIG. 12, the flow of processes performed in the first, second, and third embodiments will now be described.

The user starts the image capturing operation of the digital camera. In step S1100, as shown in FIGS. 2, 4A, 4B, and 7, the user sets the color space or the output device for recording the image (or the color reproduction range of the output device) via the user interface 112. Although the setting is done by the user in this example, a default setting may be preset in the digital camera. In step S1101, the user sets the image capturing condition, such as the exposure, photometric value, ranging position, or the like, or the image generating parameter, such as the chroma, tone, or the like. In step S1102, captured image data is generated from an output signal from the imager 101, and the captured image data is stored in the buffer memory 103. The captured image data is displayed on the EVF.

In step S1103, with respect to the captured image data output from the imager 101, the out-of-gamut-region extracting circuit 107 detects an out-of-gamut region outside the color gamut of the preset color space or the color reproduction range of the output device using the above-described determination method or the like in accordance with the image capturing condition or the image generating parameter set in step S1101. If it is determined in step S1104 that there is an out-of-gamut region, in step S1105, the out-of-gamut region and the captured image data are displayed, as shown in FIGS. 1A and 1B. If it is determined in step S1106 that the captured image data contains numerous out-of-gamut regions and that the user does not confirm the processing result, the process returns to step S1101. The user changes the settings of the image capturing condition, the image generating parameter, the color space, and/or the output device (or the color reproduction range of the output device) and again detects an out-of-gamut region. The user may change the settings until he or she is satisfied. When it is determined in step S1104 that the captured image data contains no out-of-gamut region or when the captured image data contains only a few number of out-of-gamut regions and the user is satisfied with the processing result in step S1106, in step S1107, it is determined whether or not an image capturing button is pressed by the user. If it is determined in step S1107 that the image capturing button is pressed by the user, in step S1108, the captured image data and the image capturing condition, the color space, the image generating parameter, and/or the output device (or the color reproduction range thereof) set at that time are recorded on the recording medium 106.

In a case in which the color reproduction range of the output device and the image generating parameter are set and the output device such as a printer is connected to the digital camera, in step S1108, the captured image data may not be recorded on the recording medium 106, but may be directly output to the printer on the basis of the preset color gamut and parameter.

As described above, at the time the image is captured, the out-of-gamut region outside the color gamut of the color space for recording the image or the color reproduction range of the output device is subjected to confirmation prior to the actual output in accordance with the preset image capturing condition or the image generating parameter. Since the captured image data is checked for any out-of-gamut region at the time the image is captured and the user can change the setting, the optimal captured image within the preset color gamut is recorded.

With reference to FIG. 13, a process of checking a recorded image, such as a rec review image after the image has been captured or a post view image, for any out-of-gamut region will now be described.

In step S2101, the rec review image after the image has been captured is displayed on the EVF for a predetermined period of time. Alternatively, the post view image read from the recording medium 106 is displayed on the EVF. In step S2102, an out-of-gamut region outside the color gamut of the preset color space or the color reproduction range of the output device is determined in accordance with the image capturing condition or the image generating parameter specified at the time the image is recorded. If it is determined in step S2103 that the captured image data contains an out-of-gamut region, in step S2104, the out-of-gamut region is displayed. In step S2105, the user confirms the out-of-gamut region. In particular, in the case of the rec review image, when the user does not confirm the processing result in step S2105, the process returns to the image capturing operation. Accordingly, the user may change the image capturing condition or the like and again capture an image. This prevents the user from recording a low-quality captured image containing an out-of-gamut region on the recording medium. By changing the image generating parameter to an optimal parameter or reselecting a different color space or a different output device, the user may again confirm an out-of-gamut region and record optimal color space and parameter on the recording medium.

As described above, after the image has been captured, the user can easily check the captured image for any out-of-gamut region on the basis of the setting at the time the image is captured. Also, the user can change and record the optimal parameter for adjusting the captured image to fit within the preset color gamut.

Modifications

According to a modification of the present invention, various devices are operated to implement functions in the above-described embodiments. Software program code for implementing the functions in the above-described embodiments is supplied to a computer in each apparatus or system connected to the various devices. In accordance with the program stored in the computer (CPU or MPU) of the system or apparatus, the various devices are operated to implement the functions. This modification is included in the scope of the present invention.

In this case, the software program code implements the functions in the above-described embodiments. The program code itself and means for supplying the program code to the computer, e.g., a recording medium storing the program code, are included in the present invention. The recording medium storing the program code may include, for example, a flexible disk, a hard disk, an optical disk, a magneto-optical disk, a CD-ROM, a magnetic tape, a non-volatile card memory, and a ROM.

The functions in the above-described embodiments are implemented when the computer executes the supplied program code. Alternatively, the functions in the above-described embodiments are implemented by the computer cooperating with an operating system (OS) or other application software running on the computer. In this case, the program code is included in the embodiments of the present invention.

The supplied program code is stored in a memory of a feature expansion board of the computer or in a feature expansion unit connected to the computer. Subsequently, a CPU or the like of the feature expansion board or the feature expansion unit performs part or the entirety of the actual processing on the basis of instructions from the program code. With the processing, the functions in the above-described embodiments are implemented. Such a case is also included in the present invention.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An image capturing apparatus for generating, from a captured image created by capturing an image of a subject in accordance with an image capturing condition specified by a user, image data represented in a predetermined color space selected from among a plurality of color spaces, comprising:
   a detector which detects, from the image data, an out-of-gamut region falling outside the color gamut of the predetermined color space in accordance with the image capturing condition; and
   an out-of-gamut-region display unit which displays the out-of-gamut region.

2. An image capturing apparatus according to claim 1, further comprising:
   a color space selector which selects a color space of the image data; and
   an out-of-gamut-region display unit which displays an out-of-gamut region, which is part of the image data, falling outside the color gamut of the color space selected by the color space selector along with the captured image.

3. An image capturing apparatus according to claim 2, wherein a plurality of types of color spaces to be selected by the color space selector is provided, and the color space selector selects at least one color space from among the plurality of types of color spaces.

4. An image capturing apparatus according to claim 3, wherein the plurality of types of color spaces includes sRGB, esRGB, NTSC (National Television System Committee), PAL/SECAM (Phase Alternate by Line/Sequential Couleur a Memoire), and Adobe RGB.

5. An image capturing apparatus according to claim 1, further comprising:
   an image parameter selector which selects an image parameter for generating the image data from the captured image; and
   an out-of-gamut-region display unit which displays the out-of-gamut region falling outside the color gamut of the predetermined color space in the captured image.

6. An image capturing apparatus according to claim 5, wherein the image parameter of the image data is a chroma parameter for determining chroma.

7. An image capturing apparatus according to claim 5, wherein the image parameter of the image data is a tone parameter for determining tone.

8. An image capturing apparatus for generating, from an image created by capturing an image of a subject in accordance with an image capturing condition specified by a user, a captured image represented in a predetermined color gamut, comprising:
   an image-output-device selector which selects an image output device for outputting the captured image;
   a detector which detects an out-of-gamut region falling outside the reproducible color gamut of the image output device; and
   an out-of-gamut-region display unit which displays the out-of-gamut region detected by the detector along with the captured image.

9. An image capturing apparatus according to claim 8, wherein the image output device comprises a monitor or a printer.

10. An image capturing apparatus according to any one of claims 2 to 9, wherein the out-of-gamut-region display unit displays the out-of-gamut region of at least one of displayed images including an electronic view finder image, a rec review image, a post view image, and a recorded image.

11. An image capturing method of generating, from a captured image created by capturing an image of a subject in accordance with an image capturing condition specified by a user, image data represented in a predetermined color space selected from among a plurality of color spaces, comprising:
   detecting, from the image data, an out-of-gamut region falling outside the color gamut of the predetermined color space in accordance with the image capturing condition; and
   displaying the out-of-gamut region.

12. An image capturing method according to claim 11, further comprising:
   selecting a color space of the image data; and
   displaying an out-of-gamut region, which is part of the image data, falling outside the color gamut of the selected color space along with the captured image.

13. An image capturing method according to claim 11, further comprising:
   selecting an image generating parameter for generating the image data from the captured image; and
   displaying the out-of-gamut region, which is part of the image data, falling outside the color gamut of the predetermined color space along with the captured image.

14. An image capturing method of generating, from an image created by capturing an image of a subject in accordance with an image capturing condition specified by a user, a captured image represented in a predetermined color gamut, comprising:

selecting an image output device for outputting the captured image;

detecting an out-of-gamut region falling outside the reproducible color gamut of the image output device; and displaying the detected out-of-gamut region along with the captured image.

15. An image capturing method according to claim 14, wherein the image output device comprises a monitor or a printer.

16. An image capturing method according to any one of claims 11 to 15, wherein the out-of-gamut region of at least one of displayed images including an electronic view finder image, a rec review image, a post view image, and a recorded image is displayed.

17. A computer program embodied on a computer-readable medium for causing a computer to perform an image capturing method as set forth in claim 11.

18. A computer-readable recording medium having recorded thereon a computer program as set forth in claim 17.

19. An image capturing method comprising:

a first display step of displaying a captured image;

an image capturing parameter setting step of setting, in the first display step, an image capturing parameter of a subsequently captured image; and an out-of-gamut determining step of determining whether or not the captured image fits within a predetermined color gamut in accordance with the parameter in the image capturing parameter setting step.

20. An image capturing method according to claim 19, further comprising a second display step of displaying the determination result in the out-of-gamut determining step.

21. An image capturing method according to claim 19, wherein the image capturing parameter includes at least one of an image capturing condition, a color space, an image generating parameter, and an output device's color gamut.

22. A computer program embodied on a computer-readable medium for causing a computer to perform an image capturing method as set forth in claim 19.

23. A computer-readable recording medium having recorded thereon a computer program as set forth in claim 22.

24. An image capturing apparatus comprising:

an image capturing unit which captures an image of a subject and outputs a captured image signal;

an A/D converter which AID-converts the captured image signal and outputs image data;

a storage unit which temporarily stores the image data generated by the A/D converter;

a compressor which compresses the image data stored in the storage unit;

an image data input/output unit which writes the image data compressed by the compressor into a recording medium or reads the image data from the recording medium;

an out-of-gamut determining unit which determines whether the image data fits within a predetermined color gamut; and an out-of-gamut-region display unit which displays an out-of-gamut region, which is part of the image data, falling outside the predetermined color gamut.

* * * * *

UNITED STATES PATENT AND TRADEMARK OFFICE
CERTIFICATE OF CORRECTION

| | |
|---|---|
| PATENT NO. | : 7,233,694 B2 |
| APPLICATION NO. | : 10/452225 |
| DATED | : June 19, 2007 |
| INVENTOR(S) | : Fukui |

It is certified that error appears in the above-identified patent and that said Letters Patent is hereby corrected as shown below:

<u>COLUMN 18</u>:
Line 15 Claim 24, "AID-converts" should read --A/D converts--.

Signed and Sealed this

Twenty-fourth Day of February, 2009

JOHN DOLL
*Acting Director of the United States Patent and Trademark Office*